United States Patent [19]

Parsons et al.

[11] Patent Number: 4,548,845
[45] Date of Patent: Oct. 22, 1985

[54] REDUCED BUILD-UP PRESSURE-SENSITIVE ADHESIVES

[75] Inventors: Robert E. Parsons, Painesville; Martha L. Westcott, Leroy Township, Lake County; Susan L. Johnson, Euclid, all of Ohio

[73] Assignee: Avery International Corp., Pasadena, Calif.

[21] Appl. No.: 487,305

[22] Filed: Apr. 21, 1983

[51] Int. Cl.[4] .............................. C08K 5/06
[52] U.S. Cl. .................... 428/40; 524/272; 524/274; 524/377; 428/355; 428/914
[58] Field of Search ............ 524/377, 272, 274; 428/40, 355

[56] References Cited

U.S. PATENT DOCUMENTS

| 3,162,611 | 12/1964 | Varron | 524/377 |
| 3,413,250 | 11/1968 | Varron | 524/377 |
| 3,492,258 | 1/1970 | Kremer | 524/272 |
| 3,775,146 | 11/1973 | Reckziegel | 524/272 |
| 4,104,218 | 8/1978 | Hous | 524/377 |
| 4,129,539 | 12/1978 | Fakla | 524/377 |
| 4,346,189 | 8/1982 | Laurent | 428/355 |
| 4,379,095 | 4/1983 | Oldack | 524/377 |
| 4,413,080 | 11/1983 | Blake | 524/272 |
| 4,413,082 | 11/1983 | Gleichenhagen | 524/272 |
| 4,427,737 | 1/1984 | Cilento | 428/355 |
| 4,442,258 | 4/1984 | Sunakawa | 524/377 |
| 4,492,724 | 1/1985 | Allbright | 428/355 |

FOREIGN PATENT DOCUMENTS 1809124 7/1970 Fed. Rep. of Germany .
2115431 2/1982 United Kingdom ........... 524/377

*Primary Examiner*—C. Warren Ivy
*Attorney, Agent, or Firm*—Dressler, Goldsmith, Shore, Sutker & Milnamow, Ltd.

[57] ABSTRACT

A water-insoluble, normally tacky, pressure-sensitive adhesive is disclosed having reduced build up on a knife blade when that knife blade is utilized to shear a plurality of webs including a layer of the adhesive. The adhesive contains a mixture of non-volatile components including (a) a water-insoluble elastomeric polymer, (b) a tackifier and (c) a polyoxyalkylene polyol present in amount of about 3 to about 45 percent of the total non-volatile weights of components (a), (b) and (c). The adhesive components (a), (b) and (c) are dispersed substantially homogeneously when the adhesive is applied to a substrate.

25 Claims, 3 Drawing Figures

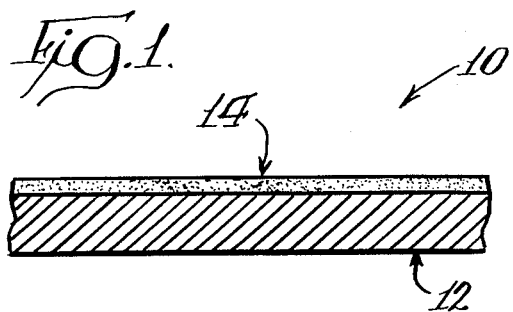
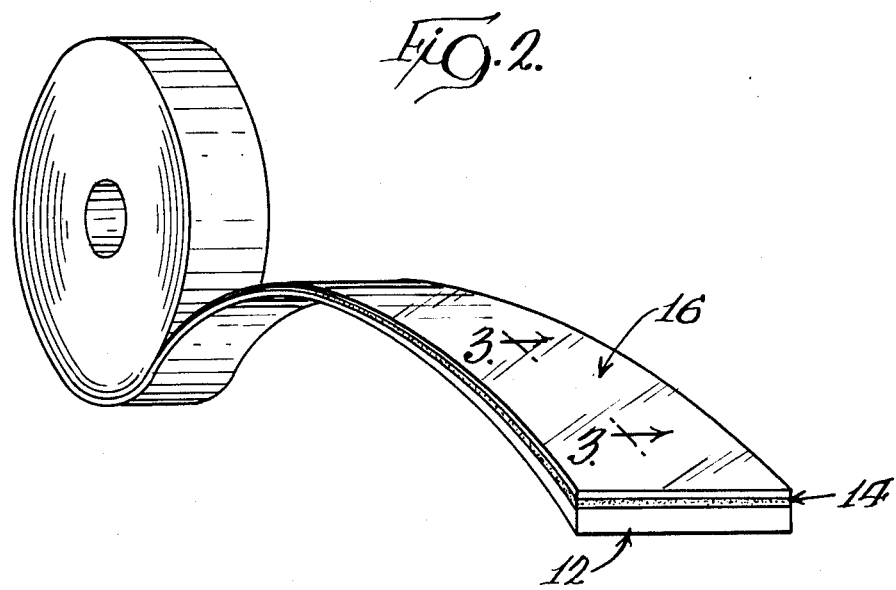
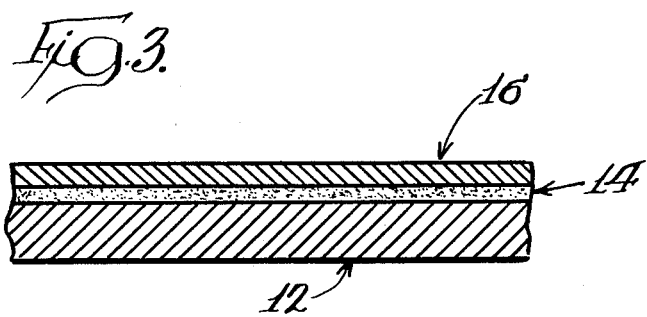

REDUCED BUILD-UP PRESSURE-SENSITIVE ADHESIVES

TECHNICAL FIELD

The present invention relates to normally tacky, pressure-sensitive adhesives, and more particularly to such adhesives that provide reduced build-up on a knife blade when a plurality of substrates including a layer of the adhesive are sheared with the knife blade.

BACKGROUND ART

Tapes and labels including a layer of a normally tacky, pressure-sensitive adhesive adhered to at least one surface of a supporting web are typically sheared to size during one or more operations in their manufacture. Shearing of a plurality of layers of such tapes and labels typically is carried out by using a knife blade. This operation is known in the art as guillotining.

During a guillotining or other similar shearing step, the pressure-sensitive adhesive has the tendency to flow either because of its general liquidity, or as a combination of that general liquidity and the exertion of pressure exerted by the knife blade alone or in conjunction with that exerted by a means for holding a plurality of tapes or labels during this shearing operation. As a result of the adhesive flow during a guillotine operation, the knife blade tends to become coated with a layer of adhesive. That coating tends to reduce the efficacy of further shearing cuts and also can deposit and smear adhesive on the edge surfaces of the articles being cut.

U.S. Pat. No. 4,346,189 disclose the use of a polysiloxane additive in solvent-based normally tacky, pressure-sensitive adhesives to reduce the flow at cut edges in the preparation of adhesive tapes and labels containing pressure-sensitive adhesives. While the use of polysiloxanes to reduce the build-up of adhesive on the knife blade and reduce flow of the adhesive during guillotining operations provides some benefit, the polysiloxane materials disclosed in U.S. Pat. No. 4,346,189 are relatively costly.

Polyoxyalkylene polyols such as polyethylene glycol have been used in adhesive compositions at various concentrations and in average molecular weights which range from about 200 to about 20,000. U.S. Pat. No. 3,096,202 describes the use of a polyethylene glycol present at about 15 to about 100 percent of the weight of a partially cross-linked elastomeric polyvinyl pyrrolidone polymer in the formation of a water-soluble but normally tacky, pressure-sensitive adhesive. U.S. Pat. No. 3,540,580 teaches water-based, thermoplastic heat sealing adhesives made from a polyvinyl acetate emulsion which may contain a polypropylene glycol or other ingredient as an antipenetrant to decrease the wetting properties of the formed adhesive. U.S. Pat. No. 4,068,033 discloses an adhesive composition that becomes tacky when heated and may contain a polyethylene glycol as a tackifying ingredient. U.S. Pat. No. 4,129,359 discloses a repulpable hot melt adhesive based upon vinyl copolymers in which polyethylene glycols having molecular weights of about 10,000 to about 20,000 are utilized to assist in water solubility of the ultimate adhesive while polyethylene glycols of a molecular weight of about 200 to about 1,000 are utilized as plasticizing agents. U.S. Pat. No. 4,325,851 discloses water activated hot melt-applied adhesives that can use a polyethylene glycol wax having a molecular weight of about 4,000 to about 20,000 to assist in retarding of blocking of adhesive-coated sheets. However, none of the above art teaches or suggests the present invention.

BRIEF SUMMARY OF THE INVENTION

A water-insoluble, normally tacky, pressure-sensitive adhesive, a composition containing that adhesive, pressure-sensitive tapes and labels and a method for forming the same are disclosed in accordance with this invention. The water-insoluble, normally tacky, pressure-sensitive adhesive comprises a mixture of non-volatile components including (a) a water-insoluble elastomeric polymer, (b) a tackifier, and (c) a polyoxyalkylene polyol such as polyethylene glycol having a molecular weight of about 200 to about 20,000. The polyoxyalkylene polyol is present in the adhesive composition in an amount of about 3 to about 45 percent of the total non-volatile weight of components (a), (b), and (c), and the adhesive components are dispersed substantially homogeneously when applied to a substrate. Once the adhesive of this invention is deposited upon a substrate, it provides reduced build-up upon a knife blade when a plurality of adhesive-bearing substrates are sheared with that knife blade, as in a guillotining operation.

The water-insoluble normally tacky, pressure-sensitive adhesive may be utilized as substantially all or as a part of an adhesive composition. Thus, the adhesive may be used alone, in a molten state in a hot melt adhesive, dispersed in an organic solvent, or dispersed in an aqueous medium. The adhesive of this invention as applied from an adhesive composition of a substantially water-free medium, as from a hot melt or organic solvent solution, preferably contains a relatively low molecular weight synthetic rubber and a polyoxyalkylene polyol having a molecular weight of about 200 to about 2,000. When the elastomeric polymer is a relatively high molecular weight material such as an emulsion polymerized acrylic resin and the adhesive is applied to a substrate from an adhesive composition of an aqueous medium, the polyoxyalkylene polyol preferably has a molecular weight of about 2,000 to about 20,000.

Adhesive webs of this invention including adhesive tapes and labels include a backing member that defines a top and a bottom surface. At least one surface of the backing member has a layer of the normally tacky, pressure-sensitive adhesive of this invention adhered to it. In the case of an adhesive web that is intended as a label, a release sheet is removably adhered to the adhesive layer to form a sandwich structure having at least three layers; i.e., (1) the backing member having adhesive adhered to at least one surface, (2) the adhesive layer which has (3) the release sheet adhered to it.

The present invention provides several benefits and advantages. One such benefit is that adhesive build-up on a guillotining knife blade is reduced by use of the present adhesive. A further benefit is that the smearing of adhesive on the cut edges of adhesive webs, e.g. tapes and labels, that is usually attendant to a shearing operation is also reduced thereby permitting removal of individual adhesive webs from a stack of such webs that has been sheared by the knife blade.

One of the advantages of the present invention is that reduced knife blade build-up and reduced smearing of adhesive can be obtained by the use of a relatively inexpensive and commercially available material.

Still further benefits and advantages of the present invention will be apparent to those skilled in the art from the disclosures which follow.

BRIEF DESCRIPTION OF THE DRAWINGS

In the drawings forming a portion of this disclosure wherein like numerals are employed to designate like parts throughout the same:

FIG. 1 illustrates an expanded, cross-sectional view of an adhesive web of this invention;

FIG. 2 illustrates a roll of adhesive web of this invention; and

FIG. 3 illustrates an expanded, cross-sectional view of a portion of the adhesive web of FIG. 2 taken along line 3—3.

DETAILED DESCRIPTION OF THE INVENTION

The water-insoluble, normally tacky, pressure-sensitive adhesive of this invention comprises three principal non-volatile components: (a) a water-insoluble elastomeric polymer, (b) a tackifier, and (c) a polyoxyalkylene polyol. Additional ingredients or additives such as antioxidants, plasticizing oils, fillers, dispersing agents and the like may also be present as non-volatile components. However, only the weights of the non-volatile of components (a), (b) and (c) are utilized determining the amount of polyoxyalkylene polyol is present.

The adhesive of this invention is insoluble in water when taken as the total admixture. Thus, an adhesive tape of this invention made using an adhesive of this invention when immersed in water for a period of about 30 seconds does not become slippery nor lose an appreciable amount adhesion due to leaching of the polyoxyalkylene polyol that can itself be water-soluble.

The elastomeric polymer component may be selected from a wide variety of water-insoluble homopolymers and copolymers as are known in the adhesive art. Broadly, the useful elastomeric polymers include rubbery materials such as natural or more preferably synthetic rubbers, acrylic elastomers as well as carboxylated synthetic rubbers.

More specifically, the useful rubbery materials include natural rubber, as well as synthetic rubbery homopolymers and copolymers. Particularly preferred synthetic rubbers are thermoplastic copolymers such as A-B-A or A-B block copolymers which are well known materials having thermoplastic blocks conventionally designated as A blocks, and rubbery blocks conventionally designated as B blocks. These rubbery block copolymers may be linear, branched or radial.

Exemplary materials which may constitute the thermoplastic A block of such polymers are the alkenylarenes, preferably styrene but may also include styrene homologues and analogues such as alpha-methylstyrene, 4-methylstyrene, 2-ethyl-4-benzylstyrene, and the like. The B block portions of the block copolymers are typically prepared by the copolymerization of a conjugated lower aliphatic diene containing about 4 to about 6 carbon atoms. Such B block monomers may be illustrated by butadiene, isoprene, 1,3-pentadiene and the like.

Many of the block copolymers are commercially available. Exemplary of such commercially available materials are those materials sold under the trademarks KRATON 1102 and KRATON 4141 (styrene-butadiene-styrene), KRATON 1107 (styrene-isoprene-styrene) by Shell Chemical Company and the products sold under the trademarks SOLPRENE 311 (styrene-isoprene) and SOLPRENE 1205 (styrene-butadiene) by Phillips Petroleum Company.

In addition to the above block copolymers, random copolymers containing the above-described thermoplastic and rubbery monomers are also useful. One example of such a polymer is that sold under the trademark SYNPOL 1707 which is a random copolymer of styrene and butadiene by the Texas-US Chemical Company. Also useful are homopolymers such as homopolybutadiene and homopolyisoprene both of which are available from a number of commercial sources as are rubbery copolymers prepared from butadiene, isoprene, iso-butylene and the like. Mixtures of two or more synthetic rubber elastomers are particularly preferred. Further disclosures as to useful water-insoluble, elastomeric, rubbery polymers may be found in U.S. Pat. Nos. 4,294,936 and No. 3,676,202 which are incorporated herein by reference.

The above rubbery elastomeric polymers may be utilized either dispersed in an organic solvent solution that is preferably water-immiscible such as that formed from a mixture of heptane and toluene, which is a particularly preferred solvent system, or as hot melt compositions. Additionally useful organic solvents include hexane, ethyl acetate, methyl ethyl ketone, acetone, methanol and the like. The details of formulating and utilizing solvent-based and hot melt water insoluble, normally tacky, pressure-sensitive adhesives are well known in the art and will not be dealt with further herein.

The elastomeric polymer may also be supplied as a non-volatile component of an aqueous emulsion. Two exemplary types of polymer systems are utilized in such emulsions. One such polymer system is a carboxylated synthetic rubber, while the other is based upon acrylic technology. An exemplary carboxylated synthetic rubber is the carboxylated styrene-butadiene random copolymer is that sold under the trademark POLYSAR 222, available from Polysar, Inc. Exemplary acrylic-based elastomers provided in aqueous emulsions include the material sold by Monsanto Company under the trademark MULTIPOLYMER SOLUTION DV-3018.

The aqueous emulsion-based elastomeric polymers are characterized in containing a plurality of hydrophilic groups such as carboxy or hydroxyalkylene groups to assist in dispersing the polymer in water. It is emphasized, however, that while the elastomeric polymers useful herein may be dispersed in water, the polymers and the adhesives made using them are insoluble in water. As was the case with solvent-based and hot melt adhesives, the particular polymers useful in normally tacky, pressure-sensitive adhesives that are provided in aqueous emulsions are well known as are techniques for formulating such adhesives, and those polymers and adhesives will not be discussed in detail further here.

Several other elastomeric polymer types are useful herein in addition to the above-discussed synthetic rubbers and those based upon emulsion systems. The additional elastomeric polymers include acrylic, polyurethane, copolyester and polyolefin elastomers. Such elastomeric polymers are also well known in the art and need not be discussed further.

The second component of the water-insoluble normally tacky, pressure-sensitive adhesive is a tackifier that is preferably water-insoluble. The tackifier may be provided externally of the elastomeric polymer by the incorporation of one or more specific tackifying ingredients, or it may be present internally of the elastomeric polymer by means of a monomeric tackifying ingredient copolymerized during the manufacture of that polymer.

Exemplary externally supplied tackifying agents are represented by rosin, dehydrogenated rosin, glycerol esters of hydrogenated rosins, pentaerythritol esters of hydrogenated rosins, coumarone-indene resins, maleic anhydride-modified rosin, partial esters of styrene-maleic acid copolymers and the like. These materials are well known in the adhesive art and are commercially available from a number of sources.

The tackifier may also be internal of the polymer particularly in the case where the elastomeric polymer is an acrylic resin. In such instances, it is well known that the glass transition temperature of an acrylic copolymer may be reduced to less than room temperature by means of one or more softening monomers, thereby making a film prepared from such a polymer soft, and normally tacky. Exemplary softening monomers include butyl acrylate and 2-ethylhexyl acrylate. The amount of internal tackifier needed to provide a normally tacky film is well known in the art.

The third major component of the adhesive is a polyoxyalkylene polyol, and it is this component which is principally responsible for providing the benefits of this invention insofar as reducing the amount of build-up on a knife blade during shear of a web having the adhesive of this invention adhered thereto as a layer, and also the oozing or smearing of the adhesive from one adhesive web to another on cut web edges along the line of the shear during such guillotining or shearing operations.

Useful polyoxyalkylene polyols have a molecular weight of about 200 to about 20,000 and are present in the water-insoluble, normally tacky, pressure-sensitive adhesive at about 3 to about 45 percent by weight of the total non-volatile components; i.e., the total non-volatile weight of elastomeric polymer, tackifier and polyoxyalkylene polyol. The polyoxyalkylene polyol is more preferably present at about 5 to about 25 weight percent of the total of the non-volatile weights of the three components, and most preferably it is present at about 5 to about 15 percent of those total weights.

When the adhesive of this invention is applied to a substrate, the polyoxyalkylene polyol is dispersed substantially homogeneously therein. Thus, in the case of a solution-based adhesive composition, the polyoxyalkylene polyol may be dispersed or dissolved in the solvent-adhesive composition to form an adhesive composition which does not separate at the time it is used. Similarly for the adhesive compositions based on aqueous media such as emulsions, the polyoxyalkylene polyol is dispersed substantially homogeneously throughout the emulsion or other dispersal system at the time of use. In the case of hot melt adhesive compositions, the useful polyoxyalkylene polyol is substantially stable to the elevated temperature conditions, such as about 250° F. to about 450° F. at which the adhesive components are melted and extruded, and forms a substantially homogeneous, melted, water-insoluble, normally tacky, pressure-sensitive adhesive As used herein regarding the state of the polyol in an adhesive or adhesive composition, the term "dispersed" in its various grammatical forms is meant to include dispersal by the formation of a true solution, emulsion, colloidal dispersion or the like. Such dispersions are to be contrasted with mixtures in which one or more ingredients separates from the others immediately upon the cessation of agitation, and prior to the application of the adhesive to a substrate. These meanings of the term "dispersion" as applied particularly to the state of the polyol in aqueous media are not intended to imply that the elastomeric polymer is also soluble in such media.

The alkylene portion of the polyoxyalkylene polyol typically contains 2 to 4 carbon atoms and preferably contains 2 or 3 carbon atoms. Thus, the useful polyoxyalkylene polyols are typically ethylene oxide and/or propylene oxide adducts to another polyol. Polyethylene oxide adducts to ethylene glycol; i.e., polyethylene glycols, are particularly preferred.

Exemplary of such materials are the polyethylene glycols such as those available from Union Carbide Corporation under the trademarks CARBOWAX 200, 300, 400, 540, 600, 1,000, 1450, 3350 and 20,000 wherein the numeral designates the average molecular weight. Similarly useful are the polypropylene glycol compounds such as those available from Dow Chemical U.S.A., under the trademarks POLYGLYCOL P-425, POLYGLYCOL 112-2 (a random polyoxyethyleneoxypropylene glycol), and the polyoxypropylene glycol available from BASF Wyandotte Corporation under the trademark PLURACOL 410. Commercially available polyoxyalkylene polyols having three or more hydroxyl groups are exemplified by the materials available from BASF Wyandotte Corporation under the trademarks PP440 which contains three hydroxyl groups and the material sold under the trademarks PEP450 and PEP550 which contains four hydroxyl groups. In addition, polyoxyalkylene polyols can be prepared by polyethoxylation or polypropoxylation of polyols such as glycerol, sorbitol, glucose and the like. Mixtures of polyoxyalkylene polyols are also useful.

As has been noted previously, the three principal components of the adhesive of this invention are dispersed substantially homogeneously among themselves and in any vehicle (e.g., organic solvent, water or holt melt) in which they are used at a time prior to their application to a substrate. It has been surprisingly found that lower molecular weight polyoxyalkylene polyols, e.g. those having a molecular weight of about 200 to about 2,000, tend to be more compatible and more homogeneously dispersed in adhesives containing relatively lower molecular weight elastomeric polymers, while the higher molecular weight polyoxyalkylene polyols, e.g. those having a molecular weight greater than about 2,000, tend to be more compatible with and homogeneously dispersed in adhesives containing a relatively higher molecular weight elastomeric polymers.

The molecular weights of the elastomeric polymers are typically a function of the polymer type. That is, the synthetic rubber-type elastomeric polymers such as A-B-A block copolymers tend to have molecular weights that range from about 75,000 to about 400,000, while the acrylic emulsion polymers tend to have molecular weights that are in the millions.

Thus, the polyoxyalkylene polyols having a molecular weight of about 200 to about 2,000 are preferably utilized with synthetic rubber elastomeric polymers, and are most preferably utilized with such polymers when the adhesive is applied to a substrate from an adhesive composition that is a substantially water-free medium; i.e., as a hot melt or from an organic solvent. Polyoxyalkylene polyols having a molecular weight of about 400 to about 1,000 are more preferably utilized with synthetic rubber elastomeric polymers. The polyoxyalkylene polyols having a molecular weight of about 2,000 to about 20,000, and particularly those having molecular weights of about 3,000 to about 20,000 are preferably utilized with elastomeric polymers that are emulsified acrylic resins wherein the adhesive is applied to a substrate from an aqueous medium. Polyoxyalkylene polyols having molecular weight of about 600 to about 20,000 are preferably used with emulsified, carboxylated synthetic rubbers.

Typical hot melt, organic solvent-based and externally tackified, emulsion-based adhesives in accordance with this invention generally contain (a) about 20 to about 65, and more preferably about 30 to about 50 non-volatile weight percent water-insoluble elastomeric polymer; (b) about 20 to about 70, and more preferably about 45 to about 60, non-volatile weight percent tackifier; and (c) about 5 to about 25, and more preferably about 5 to about 15, non-volatile weight percent of the polyoxyalkylene polyol. In typical, preferred, acrylic emulsion-based adhesives of this invention, the elastomeric polymer is internally tackified by means of a copolymerized softening monomer and that copolymer is present at about 55 to about 95, and more preferably about 75 to about 90, weight percent of the non-volatile adhesive components, with the polyoxyalkylene polyol component constituting the remaining about 45 to about 5, and more preferably about 25 to about 10, weight percent of the adhesive components.

Turning now to the Figures, an adhesive web 10 of this invention is shown in FIG. 1.

For ease of description, the tapes and labels of this invention will be described in normal positions of manufacture or use and terms such as upper, lower, top, bottom and the like are used with reference to these normal positions. It will be understood, however, that tapes and labels of this invention may be manufactured, stored, transported, sold and used in an orientation other than the positions described.

The adhesive web 10 includes a backing member 12 that defines the top surface and a bottom surface. At least one of those surfaces such as the top surface has a water-insoluble, normally tacky, pressure-sensitive adhesive 14 of this invention adhered thereto. The adhesive may be applied to the surface of the backing member 12 from an adhesive composition that is an organic solvent-based adhesive composition, an aqueous medium such as that provided with an adhesive composition containing an acrylic emulsion polymer as the elastomeric component, or via a hot melt.

The adhesive web 10 illustrated in FIG. 1 is useful in itself as would be any pressure-sensitive tape such as a masking tape or an adhesive tape. In addition, the adhesive web 10 may also have a release sheet 16 that is removably adhered to the layer of adhesive 14. One such structure is shown in roll form in FIG. 2 and in an expanded cross-sectional view in the FIG. 3.

A three-layered structure such as that shown in FIGS. 2 and 3 is particularly useful for the preparation of labels. When labels are to be prepared, only one surface of the backing web member 12 has a water-insoluble, normally tacky, pressure-sensitive adhesive 14 of this invention adhered thereto and the surface, such as the bottom surface as shown in FIG. 3, which has no adhesive layer is preferably adapted for receiving indicia such as offset or other printing, or writing from a pen, pencil or typewriter.

It is noted that an adhesive tape or label made in accordance with this invention need not be cut into a narrow strip which is rolled for dispensing in FIG. 2. Rather, and particularly in the case of labels, the product of this invention is manufactured in large flat sheets which have the three-layered, sandwiched structure shown in FIG. 3 and which are subsequently sheared into smaller pieces such as in a guillotining operation.

The backing member 12 of the adhesive web 10 may be formed from a number of materials including paper and non-woven fabrics, polymeric films such as those prepared from polyethylene and polypropylene, metallic foils such as those prepared from aluminum, and the like. A paper backing member made from a bleached or unbleached kraft paper is preferably utilized for the preparation of labels.

The release sheet 16 may also be formed from a number of materials as is known in the art. The release sheet 16 illustratively may be prepared from fluorine-containing polymers such as polyperfluorolethylene, but more preferably is prepared from paper which has a silicone, wax or other suitable material adhered to that surface of the release sheet 16 which is removably adhered to the layer of the adhesive 14 of this invention. Such release sheets are well known in the art.

A shearable adhesive web having a reduced amount of build-up of a water-insoluble normally tacky, pressure-sensitive adhesive upon a knife blade when a plurality of those webs bearing the adhesive are sheared with the knife blade may be generally prepared as follows: a water-insoluble elastomeric polymer and a tackifier, when not included in the elastomeric polymer, are provided. A polyoxyalkylene polyol having a molecular weight of about 200 to about 20,000 is admixed with the polymer and tackifier to form a substantially homogeneous, water-insoluble, normally tacky, pressure-sensitive adhesive wherein the polyol is admixed in an amount of about 3 to about 45 percent of the total non-volatile weights of the polymer, tackifier and polyol. The substantially homogeneous adhesive so prepared is then coated upon at least one surface of a shearable web to form a layer of that adhesive adhered to the web surface. The water-insoluble, normally tacky, pressure-sensitive adhesive may be coated from an adhesive composition including an organic solvent, an aqueous medium or while in a molten state as when a hot melt adhesive is utilized.

When a three-layered product such as a label is desired to be prepared, a release sheet defining a top surface and a bottom surface is preferably coated with a removable layer of an adhesive of this invention. The backing member is thereafter laminated to the release sheet-adhesive composite using the pressure supplied by a pair of nip rollers. Although the adhesive is first applied to the release sheet, that release sheet is removably adhered to the adhesive which sticks more firmly to the backing member, thus forming an adhesive layer-backing member adhesive web. When the adhesive is prepared in an organic solvent medium or aqueous medium, the volatile solvent or dispersing medium is removed prior to the addition of the backing member. When the adhesive is applied via a hot melt composition, e.g. at a temperature above room temperature, the molten hot melt adhesive is typically allowed to cool to approximately room temperature prior to the addition of the backing member.

It is also noted that a three-layered product, such as a label may be prepared by first applying the adhesive 14 to the backing member 12 followed by adherence of the release sheet 16 to the adhesive layer of the adhesive-covered backing member.

A water-insoluble, normally tacky, pressure-sensitive adhesive made in accordance with this invention may have a wide range of adhesion, tack and shear properties, and may be termed ultra-removable to high-strength adhesives.

Three tests are utilized in defining an adhesive of this invention. An adhesive when applied to a backing member should exceed at least the minimal values of two tests to be defined as an adhesive. Minimal values obtained in these tests relate to ultra-removable adhesives and any values greater than those minimal values define higher-strength adhesives. The tearing of an adhesive coated backing member test sheet during testing typically indicates that the adhesive has strong adhesion properties in the particular test. An ultra-removable adhesive can be expected to have a 90° peel adhesion value of about 0.05 pounds per inch of test sample width, a loop tack value of about 0.1 pounds per inch of test sample width and a shear value of about one minute using a 250 gram weight.

90° Peel Adhesion Test

The 90° Peel Adhesion Test measures the force necessary to remove an adhesive-coated sample, applied using a definite pressure to a standard stainless steel test panel, when the peel load acts at a specified speed in a direction perpendicular to the applied sample; i.e., at a 90° peeling angle. It is measured using an Instron Tensile Tester available from the Instron Corporation, with values expressed in pounds per inch of width of the sample. This test is similar to that designated PSTC-1A (appendages A, B, C, and D) of the Pressure Sensitive Tape Council (PSTC) and also TLMI Test No. VII LD 4-68, Tag and Label Manufacturers Institute, Stamford, Conn.

The apparatus utilized includes Instron Tensile Tester (constant rate of extension type), a 2"×6"×1/16" stainless steel panel having a bright annealed finish and a surface roughness height of 2.0±1 micro inches arithmetical average from the mean line, available from PSTC; a rubber-covered steel roller 3.2±0.1" in diameter and 1.75±0.05" wide, covered with rubber approximately 0.25 inches thick having a durometer hardness of 80±5, with the weight of the roller for applying pressure to the sample being 4.5±0.1 pounds; a sample die 1"×8" of the mallet type with sharp edges and square corners; and a jig permitting the panel to move freely in a horizontal position as the test sample is removed at an angle of 90°. This apparatus may also be utilized for a 180° peel test utilized for stronger adhesives in which the direction of peel is parallel rather than perpendicular.

The Instron Tensile Tester is calibrated according to the instructions supplied, with the measured force being in the range of zero to about 10 pounds to permit the desired measurement to be made in the middle 60 percent of that region. The crosshead speed (the power actuated grip separation rate) is utilized at 12"±0.5" per minute to provide a peel rate of 6" per minute, and the recording chart speed is set at 2" per minute. Uncut test samples are conditioned for at least 24 hours prior to testing at standard conditions of 23°±2° C. (73°±3.6° F.) and 50 percent +2 percent relative humidity. The samples are die cut to a size of 1"×8", and the die cut test sample is thereafter preconditioned for one hour at the above standard conditions.

The test sample is rolled down once in each direction at a rate of about 12" per minute using the 4.5 pound roller. This sample is allowed to remain applied to the stainless steel plate for 10 minutes prior to testing unless otherwise specified. The samples are tested within approximately 2.5 minutes of the elapsing of that 10 minute dwell time.

The stainless steel panel including the test sample is placed into the horizontal jig which has previously been secured into the lower jaw of the Tensile Tester. The free end of the sample is mounted in the upper grip of the Tensile Tester. The force required to remove the sample at an angle of 90° is then measured while disregarding values obtained during the peeling of the first and last one-half inch of the sample from the test panel.

The average peel adhesion value indicated on the recording chart in pounds per inch of sample width is then measured by drawing a line through the saw-tooth pattern on the chart paper so that the areas of the "teeth" above and below the line are substantially equal.

Modes of adhesion failure are reported as follows:

(1) Adhesion to Panel—During the peeling process, the adhesive is cleanly removed (to the eye) from the test panel and remains attached to the backing member. (Abbreviation-CL for clean.)

(2) Cohesive Failure—The adhesive film is split during the test leaving a complete film on both the panel and the face stock. (Abbreviation-SP for split.)

(3) Adhesion to Backing Member—The adhesive separates cleanly (to the eye) from the backing member during the test leaving the film of adhesive deposited upon the test panel. (Abbreviation-TR for transfer.)

(4) Mixed Failure—As a result of the test, the adhesive is cleanly removed in random patches from both the backing member and the test panel so that patches of adhesive on one surface are opposite clean spots on the other. (Abbreviations—P.TR for partial transfer or P.SP. for partial split.)

(5) Stain—Failure from the panel occurs and the panel is left discolored as a result of its contact with the adhesive. (Abbreviation-ST.)

Loop Tack Test

Loop Tack is that property of pressure-sensitive adhesive tape which causes the tape to adhere to a surface instantly using no external pressure to secure a more thorough contact and is also called quick-stick in the art. Loop tack is measured as the force resisting peeling of the tape at 90° from a standard surface upon which it has been applied under no other pressure than the weight of the tape itself. The Instron Tensile Tester is again used for this determination. A similar test is termed PSTC-11 Quick Stick.

The Instron Tensile Tester is used with an appropriate load cell, e.g. 0–200 pounds along with a test jig comprising a generally T-shaped metal holder having a bar of hard, treated steel capable of maintaining a polish such as that sold by Union Carbide Corporation under the trademark STELLITE affixed to its horizontal surface. Samples to be tested are die cut 1"×8" with the 8" dimension in the direction in which the test sheet was coated with adhesive. Samples are conditioned as described herein above for 90° peel adhesion testing. The test sample is marked one-half inch and one inch respectively from each end of the adhesive-coated web. The gears for the Instron Tensile Tester are set so that the crosshead speed is 20 inches per minute, and the test jig with Stellite bar is placed in the lower jaws.

Gaps for the crosshead are set using minimum and maximum gap settings on the extension cycle, with a one inch gap set from the bottom of the upper grips to the face of the Stellite bar when the jig is locked in the lower grip with the setting of the minimum on the extension cycle at zero. A three-inch gap is measured in the same manner and is set to zero on the maximum of the extension cycle. The Tensile Tester is set to cycle and then stop for each sample.

The release sheet, if present, is removed from the sample and one inch on either end of the sample is folded back upon itself so that adhesive surface is applied to adhesive surface. The ends of the sample are held together flush, with the middle section hanging down freely to provide a loop with the adhesive surface facing downwardly. The sample is then placed in the upper jaws of the Tensile Tester with one-half inch of the sample in the jaws.

The recorder is turned on and the chart speed is set at 20 inches per minute. The Instron Tensile Tester is set at 5 pounds for full scale. Upon moving the upper jaws downwardly, the center of the STELLITE bar comes into contact with the mid-section of the adhesive layer and adheres one to the other. The pen on the recorder is then turned on and the crosshead cycled upwardly to provide a reading recorded upon the chart. The sample is removed from the STELLITE bar when the crosshead stops at the three-inch gap at the top.

The high, low and average values for not less than five samples are recorded to the nearest one-tenth of a pound. Means of five average values are then calculated. Values which do not agree within 20 percent of the mean are discarded and a new mean is calculated from the remaining values. Five values which agree to within 20 percent of the mean are obtained in determining the final value which is reported in units of grams.

Static Shear Test

The static force necessary to remove an affixed pressure-sensitive adhesive sample from a standard flat surface when the load acts parallel to the surface of the sample is measured in terms of the time required to remove the test sample under a specified static load. This test measures pure shearing action, or a combination of shearing and peeling. This determination is similar to those designated PSTC-7 and ASTM standard "Holding Power of Pressure-Sensitive Tapes" of the American Society for Testing Materials, 1977 for which a numerical designation has not yet been assigned.

The apparatus here includes a stainless steel plate substantially similar to that utilized in the 90° peel adhesion test, but additionally having a line scribed one-half inch from an edge and running parallel to the longest side, free of wire edges, burrs or any ragged cutting protrusions; a shear static test stand consisting of a rack or jig to hold panels 2° from vertical so that the back of the panel forms an angle of 178° with an extended portion of an applied sample, and so that the applied weight will exert substantially no peeling forces upon the adhesive; a timer accurate to ±5 percent of the measured value is used to measure and record the time to failure of adhesive bond; a sample die sized 0.5"×2" of the mallet type having sharp edges and square corners; test weights (500 grams or 250 grams) with hooks which will allow attachment of the weight to the test sample, preferably distributing the load equally across the tape width; and a roller similar to that used for the 90° peel adhesion test. Samples are conditioned, cut and reconditioned as described before prior to making of any determinations.

The end of the adhesive which will bear the applied weight is reinforced with a cellophane-type adhesive tape. A hole is punched approximately one-half inch from the end of the sample to be tested with that hole going through the tape-reinforced section and being as nearly centered in the sample as possible. A staple is placed through the reinforced section of the sample between the hole and the end of the sample, parallel with the short edge of the sample.

The release sheet, if present, is removed from the sample and the sample is thereafter placed in the center of the test plate parallel to the test plate surface. The sample is placed from the scribed line to the edge of the plate so that the long axis of the sample forms a 90° angle with the edge of the test panel and the sample covers in an area of 0.5"×0.5". The sample is then rolled down on the test panel using the roller with forward and backward motions at a rate of 12 inches per minute.

The test panel is thereafter placed into the shear adhesion rack so that the portion of the sample including the punched hole hangs downwardly, and the timer is set at zero. The test weight is then hung onto the sample from the punched hole with care being taken to assure that the load is applied gently and without swinging. The time is stopped when the sample has been pulled free of the test panel.

The elapsed time in minutes is recorded to the nearest tenth of a minute and the weight utilized in the test is also recorded. The condition of the panel may also be recorded to indicate whether adhesive failure occurred via transfer, partial transfer, split, partial split and whether there was a heavy, medium or light residue left, as well as whether there was a heavy, medium or light stain left upon the panel or the panel was clean after failure.

Weights of 250 grams are typically used for determinations utilizing removable adhesives while 500 gram weights are utilized for permanent adhesives.

GLOSSARY

KRATON 1107 (Shell)
  styrene-isoprene-styrene block copolymer(SIS)
  % styrene=13–16
  % isoprene=87–84
KRATON 4141 (Shell)
  styrene-butadiene-styrene block copolymer(SBS), oil extended
  % oil=29% (naphthenic oil-SHELLFLEX 371)
  Polymer
    % styrene=30
    % butadiene=70
KRATON 1102 (Shell)
  styrene-butadiene-styrene block copolymer (SBS)
  % styrene=28
  % butadiene=72
SOLPRENE 311 (Phillips)
  styrene-butadiene linear block copolymer
  molecular weight=110,000
  % styrene=15
  % butadiene=85
SOLPRENE 1205 (Phillips)
  styrene-butadiene linear block copolymer
  molecular weight=83,000
  % styrene=25
  % butadiene=75
SYNPOL 1707 (Texas-US)
  random styrene-butadiene copolymer, oil extended
  % oil=37.5 (naphthenic)
  Polymer % styrene=22.5-24.5
% butadiene=77.5-75.5
Mooney viscosity=42-55 (ML-4 at 100° C., ASTMD-1646)

NATSYN 2200 (Goodyear)
cis-1,4-polyisoprene homopolymer
Mooney viscosity=82 (ML-4 at 100° C.)

POLYSAR PL-22 (Polysar)
Emulsified carboxylated styrene-butadiene random copolymer latex, pH=8.8, % solids=51
% bound styrene=42
Brookfield viscosity LVT=250 cps (#2 spindle at 50 rpm)

MULTIPOLYMER DV-3D18 (Monsanto) (now GELVA RA-3027)
Aqueous acrylic emulsion, pH=4.0-4.5, % solids=65 (min.)
viscosity=550-1,200 cps at 25° C.

SUPER STA-TAC 80 and 100 (Reichhold)
Specialty hydrocarbon resin
softening point=80° and 100° C., respectively
Acid No.=less than 1

PENTALYN H (Hercules)
Pentaerythritol ester of partially hydrogenated resin
softening point=102°-110° C.
Acid No.=7-16
viscosity, Gardner-Holdt=B-E as 60% solids in mineral spirits at 25° C.

ZONESTER 100 (Arizona)
Pentaertythritol ester of tall oil resin
softening point=100° C.
Acid No.=11

ZONAREZ 7115 (Arizona)
polyterpene resin
softening point=112°-118° C.

SHELLFLEX 412 (Shell)
petroleum oil containing a mixture of paraffinic, naphthenic, aromatic and small amounts of heterocyclic hydrocarbons
molecular weight=about 390
% polar compounds=1.3
% aromatic compounds=34.6
% saturated compounds=64.1
viscosity=92 centistokes at 40° C.

CARBOWAX 600 (Union Carbide)
polyethylene glycol
molecular weight=570-630

POLYGLYCOL P-425 (DOW)
polyoxypropylene glycol
viscosity=32-37 cks at 100°
pH value 6-9 (10% polyglycol-methanol at 25° C.)

POLYGLYCOL 112-2 (DOW)
random polyoxyethyleneoxypropylene
pH value=8.3-9.3 (1 water/10 methanol)
hydroxyl No.=32.3-37.5

TP-440 (BASF)
trimethylol proprane-based tri-functional polyol copolymer
molecular weight=425
hydroxyl No.=398

PEP 450 (BASF)
Polyether tetrol having four secondary hydroxyls
molecular weight=400
hydroxyl No.=560

PEP 550 (BASF)
polyether tetrol
molecular weight=500
hydroxyl No.=448

BEST MODES FOR CARRYING OUT THE INVENTION

Example 1. Adhesive Bases

A series of adhesive bases containing elastomeric polymers and tackifiers useful in solvent-based adhesive compositions of this invention after addition of the polyoxyalkylene polyol were prepared from the following components.

| | Adhesive bases | | |
|---|---|---|---|
| | Parts by Weight | | |
| Component | Base 1 | Base 2 | Base 3 |
| Adhesive Polymer | | | |
| NATSYN 2200[1] | 29.8 | — | — |
| Mill base[2] | 13.6 | — | — |
| SYNPOL 1707[3] | — | 4.9 | 7.85 |
| SOLPRENE 1205[4] | — | 4.9 | 23.7 |
| KRATON 4141[5] | — | 29.5 | 7.85 |
| Tackifier | | | |
| SUPER STATAC 100[6] | 27.1 | 26.6 | 15.8 |
| SUPER STATAC 80[7] | 20.3 | — | — |
| PENTALYN H[8] | 8.3 | — | — |
| ZONESTER 100[9] | — | 26.6 | 21.9 |
| ZONAREZ 7115[10] | — | — | 15.8 |
| Additives | | | |
| SHELLFLEX 412[11] | — | 6.3 | 6.08 |
| Antioxidant | 1.03 | 1.1 | 1.08 |
| | 100.13 | 100.19 | 99.98 |

[1] A polyisoprene available from Goodyear Chemical Division of Goodyear Tire & Rubber Company.
[2] An equal weight mixture of a random styrene-butadiene copolymer (SBR 1011) from B. F. Goodrich Chemical Company and calcium carbonate.
[3] A random copolymer of styrene and butadiene from Texas-U.S. Chemical Company.
[4] A styrene-butadiene A-B block copolymer from Phillips Chemical Company.
[5] A styrene-butadiene-styrene A-B-A block copolymer from Shell Chemical Company.
[6] A polymerized mixed olefin from Reichhold Chemicals, Inc.
[7] A polymerized mixed olefin from Reichhold Chemicals, Inc.
[8] A pentaerythritol ester of hydrogenated rosin from Hercules, Inc.
[9] A tall oil glyceride from Arizona Chemical Company.
[10] A pinene-dipentene copolymer resin from Arizona Chemical Company.
[11] A plasticizing, naphthenic oil with a low aromatic content from Shell Chemical Company.

Example 2: Comparative Compositions

The above adhesive bases were dissolved in a water-immiscible organic solvent containing 70 parts by weight heptane and 30 parts by weight toluene with or without an added amount of a polyoxyalkylene polyol to provide adhesive compositions. The amounts of added polyoxyalkylene polyol shown in Table 1, below, are in percents by weight of the total non-volatile weight of adhesive base and polyol. The adhesive base and polyol constituted 26-50 percent by weight of the solvent-based adhesive compositions so prepared.

The adhesive compositions so prepared were then applied to the silicone-coated surface of a standard release sheet. The adhesive composition was applied in an amount sufficient to provide an adhesive layer weighing about 18 to about 35 grams per square meter. The solvent was removed in an air circulating oven for a period of 3 minutes at a temperature of 200° F. A standard backing member comprising either 50 pound per 24"×36" ream of unbleached kraft paper or 65 pound per 24"×36" ream of bleached kraft paper was then laminated to the adhesive layer by feeding the adhesive-coated release sheet and backing member through a pair of nip rollers.

The above-mentioned three tests were then conducted as was guillotining of 100 sheets of 3"×4" label stock made from the same materials. The results obtained are shown in Tables 1, 2 and 3 below, using the beforementioned abbreviations where appropriate.

Results from guillotining were determined subjectively as to cut paper edge smear and knife blade build-up. Those data are reported as poor (P), fair (F), good (G), very good (VG) or excellent (EX) in the order "smear/build-up". The designation "Tore" in Tables 1, 2 and 3 (and also Table 4) means that the sample tore during testing thereby indicating that the adhesive force was greater than the force required to tear the paper backing member.

TABLE 1

Comparative Results:
Variation of Polyol Amount with Adhesive Base 3

| Polyoxyalkylene Polyol Amount[1] | 90° Peel Adhesion[2] | Loop Tack[3] | Shear[4] | Guillotine |
|---|---|---|---|---|
| None | Tore | Tore | 800 SP | P/P |
| 2 | 1.3 | Tore | 503 SP | P/P |
| 3 | Tore | Tore | 989 SP | F/G |
| 4 | Tore | Tore | 468 SP | F/G |
| 6 | Tore | Tore | 188 SP | G/G |
| 20 | 1.7 Leggy[5] | 4.6 TR | 35 CL | EX/EX |
| 22 | 1.4 Leggy | 3.9 TR | 7 CL | EX/EX |
| 25 | 1.3 TR | 3.6 TR | 22 CL | EX/EX |
| 27 | 1.1 ST | 3.7 TR | 2 CL | EX/EX |
| 30 | 1.0 ST | 4.0 TR | 3 CL | EX/EX |
| 35 | 1.4 ST | 2.9 TR | 4 CL[6] | EX/EX |

[1]A polyethylene glycol available under the trademark CARBOWAX 600 from Union Carbide Corporation was used.
[2]Units of pounds per inch of sample width.
[3]Units of pounds per inch of sample width.
[4]Units of minutes from application of 500 gram weight to failure.
[5]Strings of adhesive appeared at failure point.
[6]Units of minutes from application of 250 gram weight to failure.

TABLE 2

Comparative Results:
Variation of Polyol with Adhesive Base 3

| Polyoxyalkylene Polyol[1] | 90° Peel Adhesion[2] | Loop Tack[3] | Shear[4] | Guillotine |
|---|---|---|---|---|
| None | Tore | Tore | Tore | P/P |
| PEG 200[5] | 0.9 CL | Tore | 52 CL | F/G |
| PEG 400[5] | 1.4 Leggy[6] | 3.6 TR | 36 ST | F/G |
| PEG 540[5] | (180)[7] Tore | 3.7 TR | 331 SP | EX/EX |
| PEG 1450[5] | Tore | 4.3 TR | 145 SP | F/EX |
| PEG 3350[8] | *16 | * | * | G/VG |
| PEG E-200[9] | Tore | Tore | 181 CL | G/G |
| PEG E-400[9] | Tore | 2.9 TR | 160 SP | G/G |
| PEG E-600[9] | 1.4 Leggy | 3.0 Leggy | 483 SP | VG/G |
| PEG E-1000[9] | Tore | Tore | 928 SP | VG/G |
| PPG P-425[10] | 1.4 Leggy | 0.6 CL | 1 CL | P/G |
| 112-2[11] | 0.1 CL | 0.9 CL | 0 CL | F/G |
| P-410[12] | 0.0 CL | 0.0 CL | 1 SP | P/P |
| JP-440[13] | 1.6 Leggy | 3.9 TR | 6 SP | P/G |
| PEP-450[14] | Tore | Tore | 240 SP | P/G |
| PEP-550[15] | 1.1 CL | 4.2 TR | 16 ST | P/G |

[1]The polyoxyalkylene polyol comprised 15 percent of the total non-volatile weight of elastomeric polymer, tackifier and polyol, unless otherwise indicated.
[2,3,4]See notes 2, 3 and 4, respectively of Table 1.
[5]Polyethylene glycol having an average molecular weight of the numeral shown in the Table, and available under the trademark CARBOWAX plus the numeral shown from Union Carbide Corporation. PEG 540 is a mixture of PEG 300 and PEG 1450.
[6]See Table 1, note 5.
[7]Peel adhesion measured at 180° rather than 90°.
[8]Utilized at 9 percent.
[9]Polyethylene glycol having an average molecular weight of the numeral shown in the Table, and available from Dow Chemical Company under the trademark POLYGLYCOL E-plus the numeral shown.
[10]Polyoxypropylene glycol available from Dow Chemical Company under the trademark POLYGLYCOL P-425.
[11]A random polyoxyethyleneoxypropylene glycol available from Dow Chemical Company under the trademark POLYGLYCOL 112-2.
[12]Polypropylene glycol having an average molecular weight of about 540 available from BASF Wyandotte Corporation under the trademark PLURACOL 410.
[13]A trimethylol propane-ethylene oxide adduct available from BASF Wyandotte under the trademark TP-440.
[14,15]Tetrafunctional polyoxyalkylene polyols available from BASF Wyandotte under the trademarks PEP 450 and PEP 550, respectively.
[16]The asterisks indicates that data were not measured, but the admixture functioned as an adhesive.

TABLE 3

Comparative Results:
Variation of Adhesive Bases with Polyethylene Glycol (PEG)

| Adhesive Base[1] | PEG[2] | 90° Peel Adhesion[3] | Loop Tack[4] | Shear[5] | Guillotine |
|---|---|---|---|---|---|
| Base 1 | None | Tore | Tore | 800 SP | F/G |
| Base 1 | 600 | (180)[6] Tore | 0.7 Leggy[7] | 201 SP | EX/EX |
| Base 1 | 540 | (180) Tore | 3 Leggy | 700 SP | EX/EX |
| Base 2 | None | Tore | Tore | 300 SP | F/F |
| Base 2 | 600 | 0.9 Leggy | 0.6 ST | 7 ST | VG/VG |
| Base 3 | None | Tore | Tore | 800 SP | P/P |
| Base 3 | 540 | (180) Tore | 3.7 TR | 331 SP | EX/EX |

[1]Adhesive bases of Example 1 dissolved in the same solvent medium and applied in the same amounts as adhesive compositions, as previously discussed.
[2]CARBOWAX 540 or CARBOWAX 600 as shown by the numeral, and present at 15 percent of the total non-volatile weight of adhesive components.
[3,4,5]See Table 1, notes 2, 3 and 4, respectively.
[6]See Table 2, note 7.
[7]See Table 1, note 5.

The above results of Tables 1, 2 and 3 illustrate several salient points concerning the invention. First, with one exception (Table 2, P-410 entry) the admixture of about 3 to about 35 percent polyoxyalkylene polyol into the adhesive composition improved at least one quality measured during guillotining; i.e., build up of the adhesive on the knife blade. That one exception is not understood in as much as use of the similar material from Dow Chemical Corporation (Table 2, PPG P-425 entry) provided improvement in build-up as well as a useful removable adhesive. It is therefore believed that the P-410 sample used may have been contaminated.

The above data also illustrate the preference for polyethylene glycols having molecular weights of about 200 to about 2000 for use in the adhesives of the invention that are provided from adhesive compositions containing a preferred water-immiscible organic solvent. The fall-off in guillotining properties with increasing polyol molecular weight, e.g. above about 2000, is thought to be due to a decrease in homogeneity of the adhesive dispersion.

The general trend from stong adhesion toward a removable adhesive along with large improvements in guillotining as the amount of polyoxyalkylene polyol is increased are also shown by the above data.

Example 3: Hot Melt and Emulsion Adhesive Comparisons

Hot melt- and emulsion-based adhesive bases were also prepared and admixed with sufficient amounts of polyethylene glycols of different molecular weights to provide substantially homogenous, water-insoluble, normally tacky, pressure-sensitive adhesives containing the polyol at 15 percent of the non-volatile weight of the adhesive components.

Hot melt adhesive Base 4 principally contained KRATON 1107, a styrene-isoprene-styrene A-B-A block copolymer available from Shell Chemical Company, along with usual tackifiers. Hot melt adhesive Base 5 was an externally tackified material available as used herein from the National Adhesives Division of National Starch and Chemical Corporation under the trademark 70-9396.

Emulsion adhesive Base 6 was provided by an externally tackified, emulsified carboxylated styrene-butadiene random copolymer available under the trademark POLYSAR PL-222 from Polysar, Inc. Emulsion Base 7 was provided by an internally tackified, acrylic resin available as used under the trademark MULTIPOLYMER SOLUTION DV-3018 from Monsanto Company.

Comparative results obtained using the above adhesive bases 4, 5, 6 and 7 admixed with polyethylene glycol are shown below in Table 4.

TABLE 4

Comparative Results: Variation of Adhesive Bases with Polyethylene Glycol (PEG)

| Adhesive Base[1] | PEG[2] | 90° Peel Adhesion[3] | Loop Tack[4] | Shear[5] | Guillotine |
|---|---|---|---|---|---|
| Base 4 | None | Tore | Tore | — | F/F |
| Base 4 | 600 | 0.9 TR | 1.6 Leggy[6] | 3 TR | G/EX |
| Base 4 | 3350 | Tore | Tore | 119 SP | F/G |
| Base 5 | None | Tore | Tore | — | F/F |
| Base 5 | 600 | 1.5 | — | — | F/G |
| Base 5 | 3350 | Tore | — | — | F/F |
| Base 6 | None | *[7] | * | * | F/F |
| Base 6 | 600 | * | * | * | EX/VG |
| Base 6 | 3350 | * | * | * | EX/EX |
| Base 6 | 20,000 | * | * | * | EX/EX |
| Base 7 | None | * | * | * | F/F |
| Base 7 | 3350 | * | * | * | EX/G |
| Base 7 | 20,000 | * | * | * | F/G |

[1]Adhesives were applied to the same backing member in about the same amounts as the adhesives of Tables 1-3. Samples were cooled or dried, as appropriate, conditioned as discussed before and then tested.
[2]CARBOWAX 600, CARBOWAX 3350 or CARBOWAX 20,000 as shown by the numeral in the Table, and present at 15 percent of the total non-volatile weight of adhesive components.
[3,4,5,6]See Table 1, notes 2, 3, 4, and 5, respectively.
[7]An asterisk indicates that values were not measured, but the admixture functioned as an adhesive.

The above results also illustrate that smearing on shorn label edges and build-up of adhesive on a knife blade during guillotining can be reduced for hot melt- and emulsion based adhesives. Those data also further illustrate the preference of using the relatively low molecular weight rubber-type elastomeric polymers with relatively low molecular weight polyoxyalkylene polyols, e.g. adhesive Base 4, and the preference of using higher molecular weight polyoxyalkylene polyols of a molecular weight of greater than 2000 with the relatively high molecular weight elastomer adhesives that are applied from aqueous media, e.g. adhesive Bases 6 and 7.

The foregoing is intended as illustrative of the present invention but not limiting. Numerous variations and modifications may be effected without departing from the true spirit and scope of the novel concepts of the invention. It is to be understood that no limitation with respect to the specific adhesives, adhesive compositions, adhesive tapes or labels, or methods of manufacture or use illustrated herein is intended or should be inferred.

What is claimed is:

1. A normally tacky, pressure-sensitive adhesive comprising, when deposited on a substrate a mixture of non-volatile components including (a) a water-insoluble elastomeric polymer, (b) a tackifier and (c) a polyoxyalkylene polyol having a molecular weight of about 200 to about 20,000 present at about 3 to about 45 percent of the total non-volatile weight of components (a), (b) and (c), said adhesive components being substantially homogeneously dispersed when applied upon a substrate, said adhesive being water-insoluble and having improved resistance to build-up upon a knife blade when a plurality of adhesive-bearing substrates are sheared with said knife blade.

2. The pressure-sensitive adhesive according to claim 1 wherein said polyoxyalkylene polyol is present at about 5 to about 25 percent of the total non-volatile weight of components (a), (b) and (c).

3. The pressure-sensitive adhesive according to claim 1 wherein said polyoxyalkylene polyol has a molecular weight of about 200 to about 2000 and said elastomeric polymer is a synthetic rubber.

4. The pressure-sensitive adhesive according to claim 3 dispersed in an organic solvent.

5. The pressure-sensitive adhesive according to claim 1 dispersed in an aqueous medium.

6. The pressure-sensitive adhesive according to claim 5 wherein said polyoxyalkylene polyol has a molecular weight of about 600 to about 20,000 and said elastomeric polymer is an emulsified, carboxylated synthetic rubber.

7. The pressure-sensitive adhesive according to claim 1 wherein said polyoxyalkylene polyol is polyethylene glycol.

8. The pressure-sensitive adhesive according to claim 1 wherein said elastomeric polymer is a synthetic rubber selected from the group consisting of a block copolymer of styrene-butadiene, styrene-isoprene, styrene-butadiene-styrene, or styrene-isoprene-styrene, a styrene-butadiene random copolymer, homopolyisoprene, homopolybutadiene, and mixtures thereof.

9. The pressure-sensitive adhesive according to claim 1 wherein said polyoxyalkylene polyol is selected from the group consisting of polyethylene glycol, polypropylene glycol, a random polyoxyethyleneoxypropylene glycol, a polyoxyethylene adduct of glycerol or trimethylol propane or pentaerythritol or sorbitol, a polyoxypropylene adduct of glycerol or trimethylopropane or pentaerythritol or sorbitol, and mixtures thereof.

10. A normally tacky, pressure-sensitive adhesive composition comprising an organic solvent having a pressure-sensitive adhesive dispersed therein, said adhesive containing a mixture of non-volatile components including (a) a water-insoluble synthetic rubber elastomeric polymer present at about 20 to about 65 non-volatile weight percent, (b) a tackifier present at about 20 to about 70 non-volatile weight percent and (c) about 5 to about 25 non-volatile weight percent of a polyoxyalkylene polyol having a molecular weight of about 200 to about 2000, said adhesive composition being substantially homogenous at the time of application to a substrate, and after application to a substrate and removal of said solvent, said adhesive being water-insoluble and having improved resistance to build-up upon a knife blade when a plurality of adhesive-bearing substrates are sheared with said knife blade.

11. The pressure-sensitive adhesive composition according to claim 10 wherein said polyoxyalkylene is a polyethylene glycol.

12. The pressure-sensitive adhesive composition according to claim 11 wherein said polyethylene glycol is present at about 5 to about 15 non-volatile weight percent.

13. The pressure-sensitive adhesive composition according to claim 11 wherein said polyethylene glycol has a molecular weight of about 400 to 1000.

14. A normally tacky, pressure-sensitive adhesive composition comprising an aqueous dispersion of a pressure-sensitive adhesive, said pressure-sensitive adhesive containing a mixture of non-volatile components including (a) an internally tackified water-insoluble, acrylic emulsion elastomeric polymer present at about 55 to about 95 non-volatile weight percent, and (b) about 5 to about 45 non-volatile weight percent of a polyoxyalkylene polyol having a molecular weight of about 2000 to about 20,000, said adhesive composition being substantially homogenous at the time of application to a substrate, and after application to a substrate and removal of said solvent, said adhesive being water-insoluble and having improved resistance to build-up upon a knife blade when a plurality of adhesive-bearing substrates are sheared with said knife blade.

15. The pressure-sensitive adhesive compositon according to claim 14 wherein said polyoxyalkylene polyol is polyethylene glycol.

16. A normally tacky, pressure-sensitive hot melt adhesive composition comprising a mixture of non-volatile components including (a) a water-insoluble synthetic rubber elastomeric polymer present at about 20 to about 65 non-volatile weight percent, (b) a tackifier present at about 20 to about 70 non-volatile weight percent and (c) about 5 to about 25 non-volatile weight percent of a polyoxyalkylene polyol having a molecular weight of about 200 to about 2000, said adhesive composition being substantially homogeneous when in a molten state at a temperature above room temperature and at the time of application to a substrate, and after application to a substrate and cooling to about room temperature, said adhesive being water-insoluble and having improved resistance to build-up upon a knife blade when a plurality of adhesive-bearing substrates are sheared with said knife blade.

17. The pressure-sensitive adhesive composition according to claim 16 wherein said polyoxyalkylene polyol is polyethylene glycol.

18. An adhesive web including a backing member defining a top surface and a bottom surface, said backing member having a layer of water-insoluble, normally tacky, pressure-sensitive adhesive adhered to at least one of said surfaces, said adhesive comprising as non-volatile components (a) a water-insoluble elastomeric polymer, (b) a tackifier, and (c) a polyoxyalkylene polyol having a molecular weight of about 200 to about 20,000 present at about 3 to about 45 percent of the total, non-volatile weight of components (a), (b) and (c) of said adhesive, said adhesive components being substantially homogeneously dispersed at the time of application of said adhesive to said backing member, and said adhesive having improved resistance to build-up upon a knife blade when a plurality of said webs are sheared with said knife blade.

19. The adhesive web according to claim 18 further including a release sheet removably adhered to said adhesive layer.

20. A label including (1) a release sheet defining a top surface and a bottom surface, one of said surfaces being removably adhered to (2) a layer of a water-insoluble, normally tacky, pressure-sensitive adhesive, said adhesive comprising as non-volatile components (a) a water-insoluble elastomeric polymer, (b) a tackifier and (c) a polyoxyalkylene polyol having a molecular weight of about 200 to about 20,000 present at about 3 to about 45 percent of the total non-volatile weight of components (a), (b) and (c), said adhesive components being substantially homogeneously dispersed at the time of application of said adhesive to said backing member, and said adhesive having improved resistance to build-up upon a knife blade when a plurality of said labels are sheared with said knife blade, and (3) a backing member defining a top surface and a bottom surface, the bottom surface of said backing member being adapted for receiving indicia and the top surface of said backing member being adhered to said adhesive.

21. A method of forming a shearable adhesive web having a reduced amount of build-up of a water-insoluble, normally tacky, pressure-sensitive adhesive upon a knife blade when a plurality of said webs bearing said adhesive are sheared with said knife blade comprising the steps of:
providing a water-insoluble elastomeric, polymer and a tackifier;
admixing a polyoxyalkylene polyol having a molecular weight of about 200 to about 20,000 with polymer and said tackifier to form a substantially homogenous, water-insoluble normally tacky, pressure-sensitive adhesive, said polyol being admixed in an amount of about 3 to about 45 percent of the total non-volatile weights of said polymer, said tackifier and said polyol;
coating said substantially homogenous adhesive upon at least one surface of a shearable web to form a layer of said adhesive thereon.

22. The method according to claim 21 wherein said polyoxyalkylene polyol is polyethylene glycol.

23. The method according to claim 22 wherein said water-insoluble, normally tacky, pressure-sensitive adhesive is coated from an organic solvent.

24. The method according to claim 21 wherein said water-insoluble, normally tacky, pressure-sensitive adhesive is coated from an aqueous medium.

25. The method according to claim 21 wherein said water-insoluble, normally tacky, pressure-sensitive adhesive is coated while in a molten state.

* * * * *